United States Patent Office 3,133,347
Patented May 19, 1964

3,133,347
METHOD OF PREPARING ALLOYS FOR USE IN BRAZING
Arthur T. Cape, Monterey, Calif., assignor to Coast Metals, Inc., Little Ferry, N.J., a corporation of Delaware
No Drawing. Filed Oct. 2, 1961, Ser. No. 141,954
2 Claims. (Cl. 29—475)

This invention relates generally to improvements in manganese-nickel alloys, but has reference more particularly to improvements in the alloys described in my copending U.S. application, Serial No. 164,411, filed January 4, 1962, and allowed September 16, 1963.

In the aforesaid application, a brazing alloy is disclosed, which consists essentially of manganese and nickel to which optional elements such as boron, cobalt, iron, chromium, and molybdenum may be added.

Rolling or forging of these alloys into sheets or strips, as required for certain brazing applications or uses has proven difficult, but may be accomplished by annealing the alloys a large number of times between the rolling or forging operations.

I have discovered that if copper is added to the aforesaid alloys, in amounts of from about 2% to about 10%, that the alloys can be easily rolled or forged into strips, without annealing the material between the rolling or forging operations, because the copper ameliorates or lessens the tendency of the alloy to break up during rolling or forging.

The brazing material, as encompassed by this invention, will therefore be within the following range:

| | Percent |
|---|---|
| Manganese | 66–73 |
| Nickel | 15–34 |
| Copper | 2–10 |
| Boron | 0–2 |
| Cobalt | 0–30 |
| Silicon | Less than 1 |
| Iron | 0–5 |
| Chromium | 0–20 |
| Molybdenum | 0–5 |

One example of a composition coming within the present invention is a brazing composition containing 66% manganese, 30% nickel, 4% copper, and 2% boron.

Another example is a brazing composition containing 66% manganese, 15.75% nickel, 15.75% cobalt, 2% copper, and 0.5% boron.

The alloys are preferably made by melting the ingredients in a vacuum or in an inert atmosphere, cast into an ingot, and then rolled or forged into sheets or strips.

It will be understood that various changes can be made in the brazing compositions, as described, within the scope of the appended claims.

Having thus described my invention, I claim:
1. The method which comprises preparing an alloy consisting essentially of manganese in amounts of from 66% to 73%, nickel in amounts of from 15% to 34%, and copper in amounts of from 2% to 10%, rolling or forging the alloy into sheets or strips, the copper content of the alloy ameliorating or lessening the tendency of the alloy to break up during rolling or forging and enabling the alloy to be thus rolled or forged without annealing same during the rolling or forging operation, and utilizing said sheets or strips as the brazing material in a brazing operation.
2. The method, as recited in claim 1, in which the alloy may contain optional amounts of boron in amounts of from 0% to 2%, cobalt in amounts of from 0% to 30%, iron in amounts of from 0% to 5%, chromium in amounts of from 0% to 20%, and molybdenum in amounts of from 0% to 5%.

References Cited in the file of this patent
UNITED STATES PATENTS

| 2,202,012 | Long | May 28, 1940 |
| 2,349,577 | Dean | May 23, 1944 |
| 2,856,281 | Cremer et al. | Oct. 14, 1958 |

FOREIGN PATENTS

| 797,231 | France | Feb. 8, 1936 |
| 950,501 | France | Mar. 21, 1949 |
| 952,692 | France | May 9, 1949 |